United States Patent
Enomoto et al.

(10) Patent No.: US 9,541,369 B2
(45) Date of Patent: Jan. 10, 2017

(54) POSITION DETECTION DEVICE, DRIVE DEVICE, AND LENS BARREL

(71) Applicant: Panasonic Corporation, Osaka (JP)

(72) Inventors: Tatsuhiro Enomoto, Nara (JP); Makoto Umeda, Osaka (JP); Kenichi Miyamori, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 103 days.

(21) Appl. No.: 14/158,086

(22) Filed: Jan. 17, 2014

(65) Prior Publication Data

US 2014/0132251 A1 May 15, 2014

Related U.S. Application Data

(63) Continuation-in-part of application No. PCT/JP2012/005685, filed on Sep. 7, 2012.

(30) Foreign Application Priority Data

Sep. 8, 2011 (JP) .................................. 2011-195812

(51) Int. Cl.
G01B 7/04 (2006.01)
G02B 7/09 (2006.01)
(Continued)

(52) U.S. Cl.
CPC .................. G01B 7/003 (2013.01); G01B 7/14 (2013.01); G01D 5/145 (2013.01); G01D 11/30 (2013.01);
(Continued)

(58) Field of Classification Search
CPC ............. G01B 7/003; G01B 7/14; G01B 7/30; G01B 7/00; G01B 7/04; G01B 7/09
(Continued)

(56) References Cited

U.S. PATENT DOCUMENTS 6,985,176 B2 * 1/2006 Noguchi .................. 348/208.11
7,248,037 B2 7/2007 Hara et al.
(Continued)

FOREIGN PATENT DOCUMENTS

JP H09-034552 A 2/1997
JP 2000-039303 2/2000
(Continued)

OTHER PUBLICATIONS

Japanese Office Action for corresponding Japanese Application No. 2013-532457 dated Nov. 4, 2014.
(Continued)

*Primary Examiner* — Arleen M Vazquez
*Assistant Examiner* — Neel Shah
(74) *Attorney, Agent, or Firm* — Renner, Otto, Boisselle & Sklar, LLP

(57) ABSTRACT

A position detection device includes a detection portion and a magnetism generation portion. The detection portion includes a first magnetism detection element and a second magnetism detection element. The first magnetism detection element and the second magnetism detection element are disposed on a plane. The magnetism generation portion is disposed at a position opposite the detection portion. The magnetism generation portion includes mutually opposing magnetic fluxes with respect to the detection portion by performing bipolar magnetization on a face opposite the plane where the first magnetism detection element and the second magnetism detection element are disposed.

5 Claims, 16 Drawing Sheets

(51) Int. Cl.
*G02B 27/64* (2006.01)
*G01B 7/00* (2006.01)
*G03B 5/02* (2006.01)
*G01D 5/14* (2006.01)
*G01D 11/30* (2006.01)
*H04N 5/232* (2006.01)
*G01B 7/14* (2006.01)

(52) U.S. Cl.
CPC .............. *G03B 5/02* (2013.01); *H04N 5/2328* (2013.01); *G03B 2205/0015* (2013.01); *G03B 2217/005* (2013.01)

(58) Field of Classification Search
USPC ............... 324/207.11, 21, 26, 207.2, 207.21, 324/207.24, 207.25; 396/53, 55, 127
See application file for complete search history.

(56) References Cited

U.S. PATENT DOCUMENTS

| | | | |
|---|---|---|---|
| 7,692,687 | B2 | 4/2010 | Seo |
| 2005/0258822 | A1 | 11/2005 | Hara et al. |
| 2005/0258825 | A1* | 11/2005 | Masuda et al. .......... 324/207.26 |
| 2005/0270379 | A1 | 12/2005 | Seo |
| 2008/0265877 | A1* | 10/2008 | Kato ..................... G01D 5/245 324/207.25 |
| 2009/0003812 | A1* | 1/2009 | Kawai .................. G02B 27/646 396/53 |
| 2009/0085558 | A1* | 4/2009 | David .................... G01D 5/145 324/207.2 |
| 2012/0126797 | A1* | 5/2012 | Kawano et al. ......... 324/207.21 |
| 2013/0163085 | A1* | 6/2013 | Lim ................... H02K 41/0356 359/557 |

FOREIGN PATENT DOCUMENTS

| | | |
|---|---|---|
| JP | 2002-229090 A | 8/2002 |
| JP | 2003-309053 A | 10/2003 |
| JP | 2004-184319 | 7/2004 |
| JP | 2005-331400 | 12/2005 |
| JP | 2005-351917 A | 12/2005 |
| JP | 2007-241254 A | 9/2007 |
| JP | 2007-263585 | 10/2007 |
| JP | 2008-076193 A | 4/2008 |
| JP | 2010-204157 A | 9/2010 |

OTHER PUBLICATIONS

International Search Report for corresponding International Application No. PCT/JP2012/005685, mailed Oct. 9, 2012.

* cited by examiner

POSITION DETECTION DEVICE, DRIVE DEVICE, AND LENS BARREL

CROSS-REFERENCE TO RELATED APPLICATIONS

This is a continuation application of International Application PCT/JP2012/005685, with an international filing date of Sep. 7, 2012 which claims priority to Japanese Patent Application No. 2011-195812 filed on Sep. 8, 2011. The entire disclosures of International Application PCT/JP2012/005685 and Japanese Patent Application No. 2011-195812 are hereby incorporated herein by reference.

BACKGROUND

Technical Field

The technology disclosed herein relates to a position detection device. This technology also relates to a drive device. This technology further relates to a lens barrel equipped with a position detection device, and a lens barrel equipped with a drive device.

Background Information

Position detection devices have seen use in a wide variety of places in recent years. For instance, image stabilization devices used in digital still cameras and digital movie cameras have a position detection device that accurately and instantly detects the position of the lens. Conventional image stabilization device includes a pivot shaft, a electromagnetic actuator for a pitching direction, a electromagnetic actuator for a yawing direction, and two one-way position detection devices. In this position detection device, two position detection devices detects a position of image stabilization lens. With this image stabilization device, the position of the image stabilization lens is detected by two position detection devices (see Japanese Laid-Open Patent Application 2007-241254).

The technology disclosed herein provides a position detection device with which position detection can be executed in two directions simultaneously with a single package.

SUMMARY

The position detection device disclosed herein comprises a detection portion and a magnetism generation portion. The detection portion includes a first magnetism detection element and a second magnetism detection element. The first magnetism detection element and the second magnetism detection element are disposed on a plane. The magnetism generation portion is disposed at a position opposite the detection portion. The magnetism generation portion includes mutually opposing magnetic fluxes with respect to the detection portion by performing bipolar magnetization on a face opposite the plane where the first magnetism detection element and the second magnetism detection element are disposed.

BRIEF DESCRIPTION OF THE DRAWINGS

Referring now to the attached drawings, which form a part of this original disclosure.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

The lens barrel 100 used in a digital still camera, for example, in this embodiment will now be described. In this Specification, for the sake of convenience, the forward and backward direction of the digital still camera in its landscape orientation will be referred to as the Z direction, the left and right direction as the Y direction, and the up and down direction as the X direction. The subject side will be termed the "front" side, and the camera body side the "rear" side. Unless otherwise specified, the "radial direction" means the radial direction with the optical axis AX as the center, and "peripheral direction" means the peripheral direction with the optical axis AX as the center. The "optical axis direction" means the direction along the optical axis AX.

First Embodiment

1. Configuration of Lens Barrel

Figure 1:
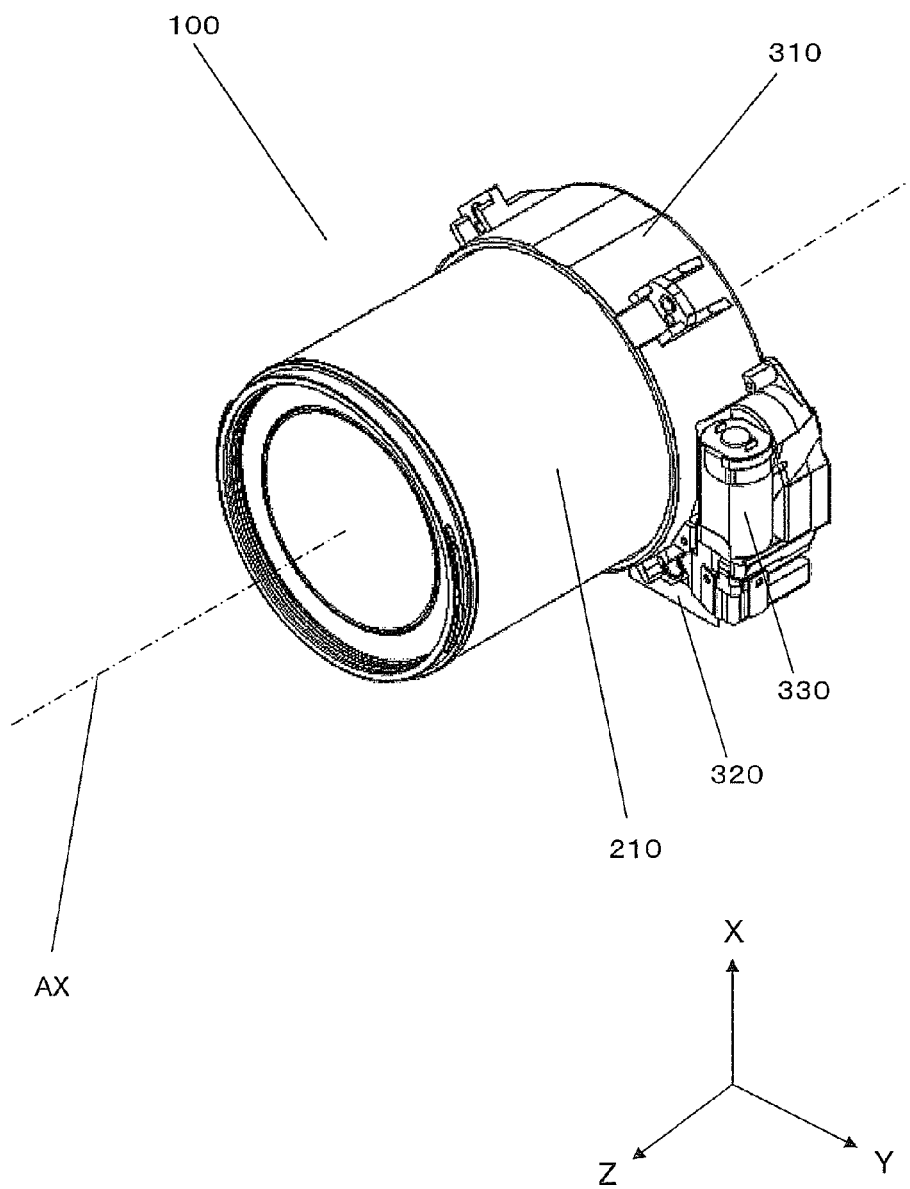
FIG. 1 is an oblique view of a lens barrel pertaining to Embodiment 1.

FIG. 1 is an oblique view of the lens barrel 100. The lens barrel 100 has a main body frame 210, a flange 310, a flexible printed board 320, and a zoom motor unit 330. The main body frame 210 has an optical system having a plurality of lenses in its interior. The optical system here has the optical axis AX. The flange 310 holds the main body frame 210. The flange 310 has an imaging element. The imaging element is disposed in the interior of the flange 310 at the imaging face of the optical system. The zoom motor unit 330 is linked to the imaging element of the flange 310 via the flexible printed board 320. The lens barrel 100 converts the image formed by the optical system into an electrical signal with the imaging element of the flange 310, and transmits this signal to an external device.

Figure 2:
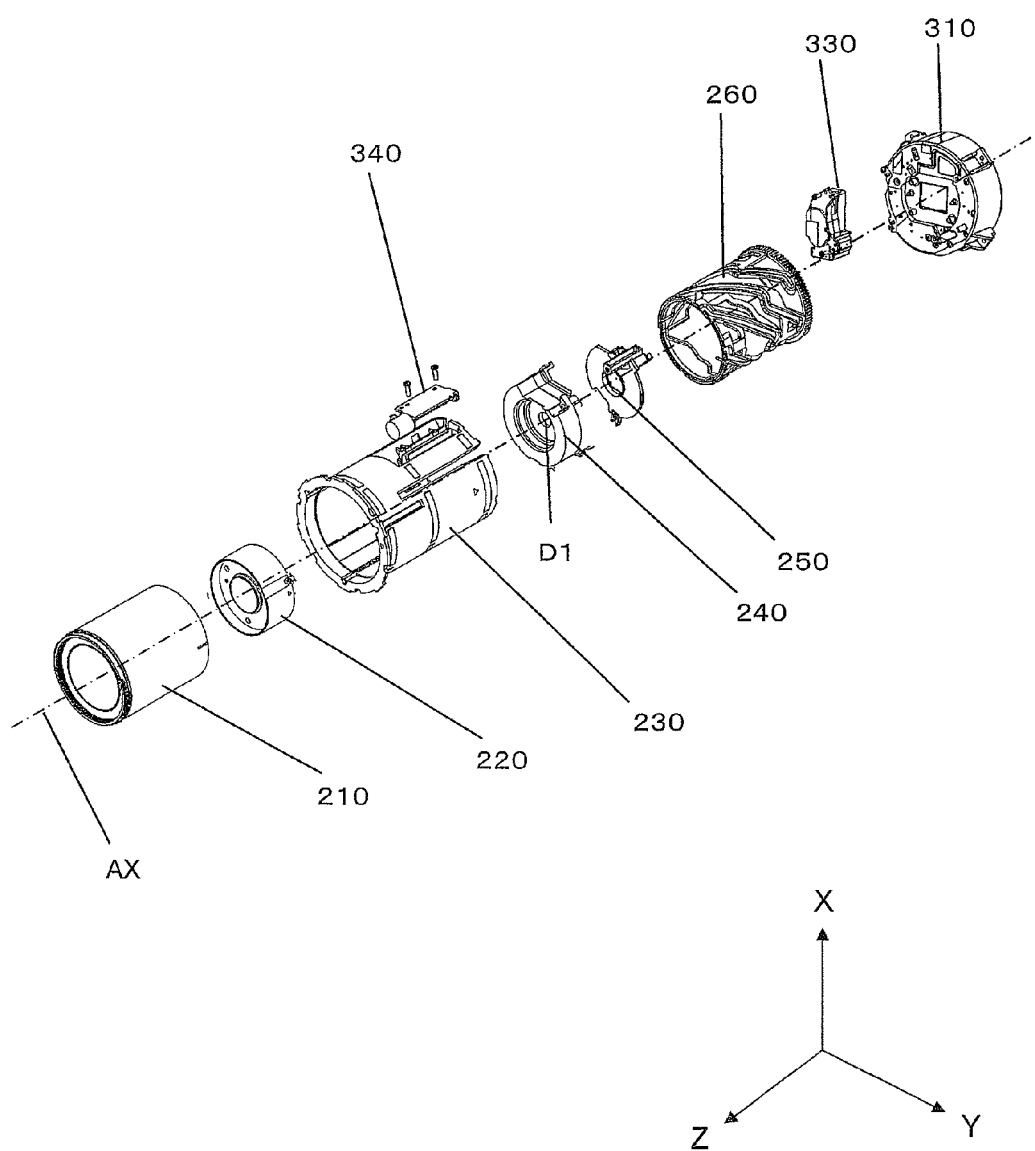
FIG. 2 is an exploded simplified diagram of the lens barrel pertaining to Embodiment 1.

FIG. 2 is an exploded oblique view of the lens barrel 100. Inside the main body frame 210 are disposed a two-group frame 220, a focus frame 230, an OIS unit 240, a focus lens frame 250, and a cam frame 260. The main body frame 210 holds a first lens group. The first lens group is the lens group disposed closest to the subject side. The two-group frame 220 holds a second lens group.

The focus frame 230 holds the two-group frame 220 and the OIS unit 240. The OIS unit 240 has an image stabilization lens 243 (see FIG. 3) and a lens drive mechanism. The focus lens frame 250 holds a lens for focal adjustment. The focus lens frame 250 is linked to a focus motor 340 via a rack and pinion mechanism. The cam frame 260 has cam grooves on its outer peripheral face and inner peripheral face. The zoom motor unit 330 has in its interior a motor for zoom drive and a gear that transmits rotational force to the cam frame 260. The flange 310 has an imaging element on a face perpendicular to the optical axis AX.

The lens barrel 100 is such that the focal position of incident light that has passed through the first lens group of the main body frame 210 and the second lens group of the two-group frame 220 along the optical axis AX is adjusted by a focus lens of the focus lens frame 250. Consequently, an image of the subject is formed on the imaging element of the flange 310. The lens barrel 100 also corrects camera shake by driving the image stabilization lens 243 in the OIS unit 240.

2. Configuration of OIS Unit

Figure 3:
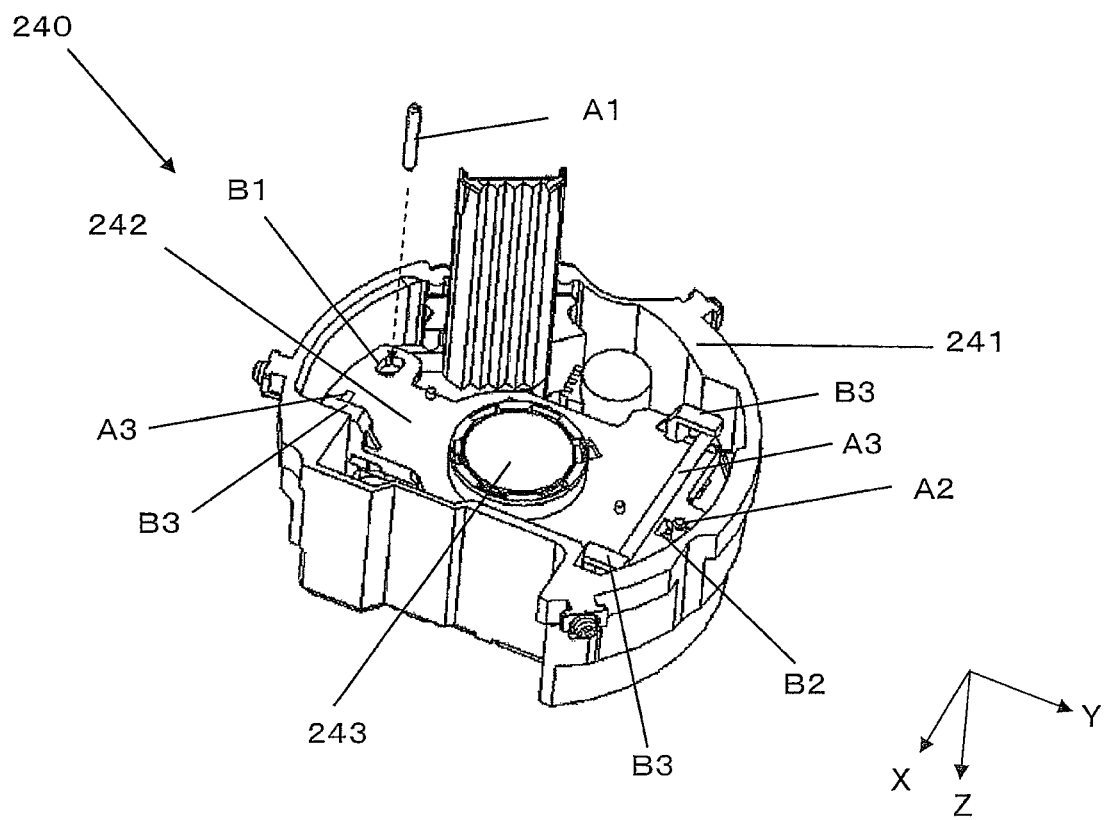
FIG. 3 is an oblique view of a lens drive unit pertaining to an embodiment.

FIG. 3 is an oblique view of the OIS unit 240 as seen from the imaging element side. The OIS unit 240 has a movable frame 242, a stationary frame 241, a position restricting pin A1, a rotational axis pin A2, and a position detection device 248 (see FIG. 4). The stationary frame 241 is the shell of the OIS unit 240.

2-1. Configuration of Movable Frame

As shown in FIG. 3, the movable frame 242 is held by the stationary frame 241 so as to be able to move in a plane perpendicular to the optical axis AX. That is, the movable frame 242 is able to move within the X-Y plane with respect to the stationary frame 241. More specifically, the movable frame 242 is capable of translation and pivoting within the X-Y plane with respect to the stationary frame 241.

The movable frame 242 engages with an interval holding pin A3 provided to the stationary frame 241. More specifically, an engagement component B3 that engages with the interval holding pin A3 is formed on the movable frame 242. When the interval holding pin A3 is engaged with this engagement component B3, the movable frame 242 is held a specific interval away from the stationary frame 241. Also, the movable frame 242 engages with the position restricting pin A1 that is press-fitted to the stationary frame 241. This position restricting pin A1 restricts the maximum amount of movement of the movable frame 242 with respect to the stationary frame 241. The movable frame 242 also engages with the rotational axis pin A2 that is press-fitted to the stationary frame 241. This rotational axis pin A2 is capable of translation and pivoting with respect to the stationary frame 241.

More precisely, the movable frame 242 supports the image stabilization lens 243. The position restricting pin A1 goes through a through-hole B1 and is fixed in a position restricting hole (not shown) of the stationary frame 241. The position restricting pin A1 is able to move inside the through-hole B1. The through-hole B1 is used to restrict the movement range of the movable frame 242. More specifically, a gap is formed between the position restricting pin A1 and the inner peripheral part of the through-hole B1. This gap permits movement of the position restricting pin A1. The rotational axis pin A2 is the rotational axis of the movable frame 242. The rotational axis pin A2 engages with a slit B2 and is fixed to a rotational axis pin hole (not shown) of the stationary frame 241. The slit B2 extends in the Y direction.

Figure 4:
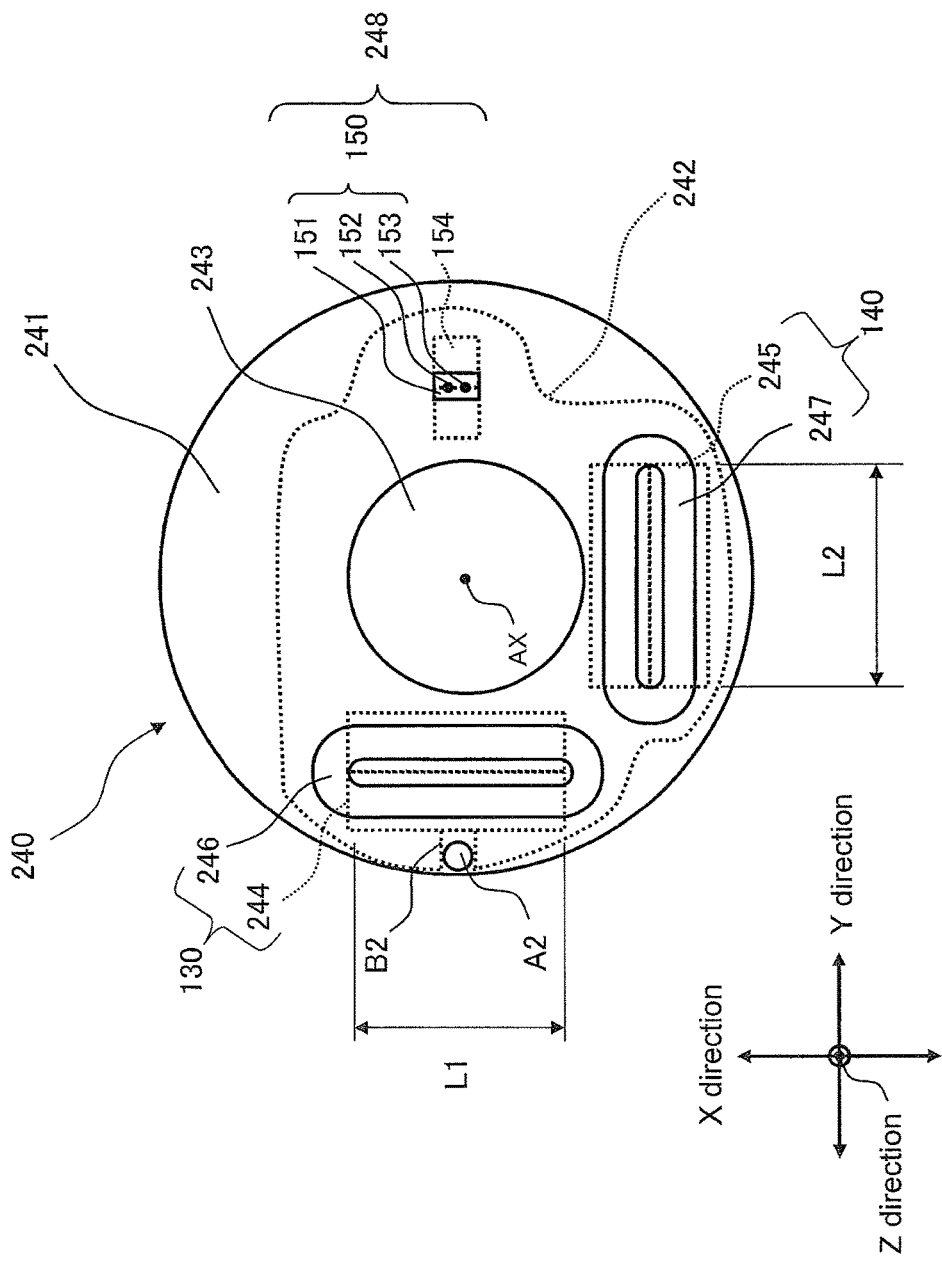
FIG. 4 is a simplified diagram of a position detection device pertaining to the embodiment.

FIG. 4 is a simplified diagram of the OIS unit 240 as seen from the subject side. The movable frame 242 and members disposed at the movable frame 242 are indicated with a broken line in FIG. 4. The configuration of the movable frame 242 will now be further described through reference to FIG. 4.

The movable frame 242 has a translational drive magnet 244 and a rotational drive magnet 245. The translational drive magnet 244 and the rotational drive magnet 245 are disposed so as to surround the image stabilization lens 243.

The translational drive magnet 244 is fixed to the movable frame 242. The translational drive magnet 244 has two magnetic poles which are an N pole and an S pole. These two magnetic poles are disposed side by side along the Y axis direction. Specifically, the translational drive magnet 244 is a magnet that is bipolarly magnetized. The translational drive magnet 244 has a polarization line extending in the X direction. The translational drive magnet 244 is disposed so that the polarization line of the translational drive magnet 244 is substantially perpendicular to a straight line connecting the slit B2 and the center of the image stabilization lens 243 (or the optical axis AX). The term "polarization line" means the boundary line at which polarity changes (the neutral magnetism line).

The rotational drive magnet 245 is fixed to the movable frame 242. The rotational drive magnet 245 has two magnetic poles which are an N pole and an S pole. These two magnetic poles are disposed side by side along the X axis direction. Specifically, the rotational drive magnet 245 is a magnet that is bipolarly magnetized. The rotational drive magnet 245 has a polarization line extending in the Y direction. The rotational drive magnet 245 is disposed so that the polarization line of the rotational drive magnet 245 is substantially parallel to a straight line connecting the slit B2 and the center of the image stabilization lens 243 (or the optical axis AX).

2-2. Configuration of Stationary Frame

As shown in FIG. 2, the stationary frame 241 is disposed inside the lens barrel 100. As shown in FIG. 3, the stationary frame 241 holds the movable frame 242 movably within a plane that is perpendicular to the optical axis AX. More specifically, a plurality of rod-shaped members, such as metal members, are fixed to the stationary frame 241. The movable frame 242 engages with these rod-shaped members. The plurality of rod-shaped members include the above-mentioned interval holding pin A3, the position restricting pin A1, and the rotational axis pin A2. The interval holding pin A3 is fixed to the stationary frame 241 so as to be substantially parallel to the movable frame 242. The position restricting pin A1 and the rotational axis pin A2 are fixed to the stationary frame 241 so as to lie along the optical axis AX.

As indicated by the solid line in FIG. 4, the stationary frame 241 has a translational drive coil 246 and a rotational drive coil 247. The translational drive coil 246 is fixed to the stationary frame 241. The translational drive coil 246 is longer in the X axis direction, and the length of the straight part in the X axis direction is the length L1. The translational drive coil 246 is disposed between the optical axis AX and the rotational axis pin A2. The rotational drive coil 247 is fixed to the stationary frame 241. The rotational drive coil 247 is longer in the Y axis direction, and the length of the straight part in the Y axis direction is the length L2. The rotational drive coil 247 is fixed to the stationary frame 241 so that that angle formed by the major axis of the rotational drive coil 247 and the major axis of the translational drive coil 246 is substantially a right angle. The translational drive coil 246 and the rotational drive coil 247 are fixed to the stationary frame 241 so as to surround a lens hole D1 (see FIG. 2).

The length L1 of the straight part of the translational drive coil 246 in the X axis direction is substantially the same as the length of the translational drive magnet 244 in the X axis direction. Also, the length L2 of the straight part of the rotational drive coil 247 in the Y axis direction is substantially the same as the length of the rotational drive magnet 245 in the Y axis direction.

2-3. Relation Between Movable Frame and Stationary Frame

The relation between the stationary frame 241 and the movable frame 242 will be described through reference to FIGS. 3 and 4.

The movable frame 242 is capable of translation and rotation with respect to the stationary frame 241. More precisely, the slit B2 is slide-supported so as to be capable of translation and rotation with respect to the rotational axis pin A2.

The movable frame 242 and the stationary frame 241 are moved relatively by a translational actuator 130 and a rotational actuator 140. More specifically, the translational actuator 130 is made up of the translational drive coil 246 and the translational drive magnet 244. The translational actuator 130 is disposed between the rotational axis pin A2 and the image stabilization lens 243. The rotational actuator 140 is made up of the rotational drive coil 247 and the rotational drive magnet 245. The rotational actuator 140 is disposed to one side in the X direction, using the lens center of the image stabilization lens 243 as a reference.

The translational drive coil 246 and the rotational drive coil 247 are mounted to the stationary frame 241. The translational drive magnet 244 and the rotational drive magnet 245 are mounted to the movable frame 242.

The translational drive coil 246 and the translational drive magnet 244 are disposed opposite each other. The translational drive coil 246 is spaced apart from the translational drive magnet 244 by a specific interval.

The rotational drive coil 247 and the rotational drive magnet 245 are disposed opposite each other. The rotational drive coil 247 is spaced apart from the rotational drive magnet 245 by a specific interval.

Thus, the movable frame 242 and the stationary frame 241 are configured so that a specific gap is formed between the coils (the translational drive coil 246 and the rotational drive coil 247) and the magnets (the translational drive magnet 244 and the rotational drive magnet 245).

2-4. Configuration of Position Detection Device

Figure 5A:
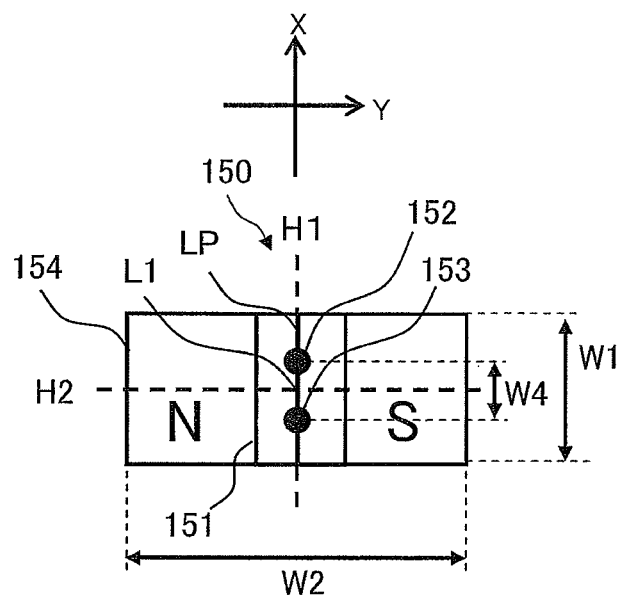
FIG. 5A is a front view of the position detection device pertaining to the embodiment.
Figure 5B:
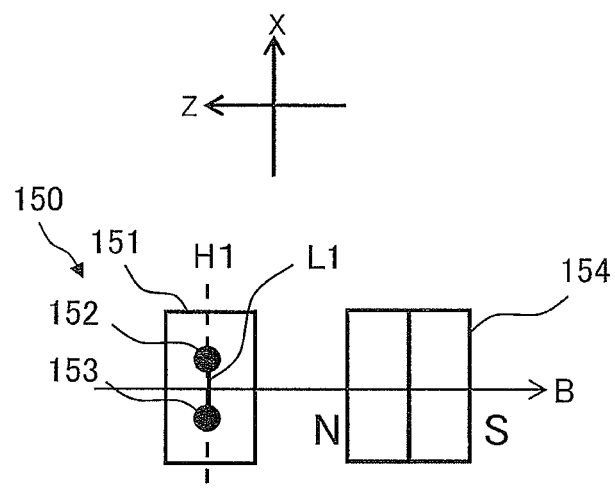
FIG. 5B is a side view of the position detection device pertaining to the embodiment.
Figure 5C:
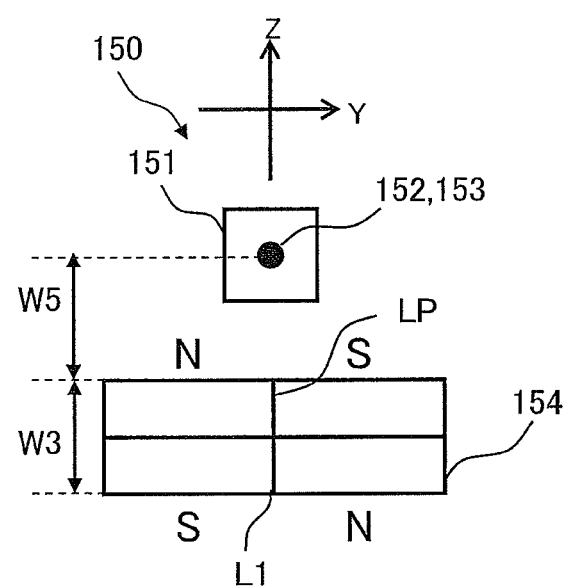
FIG. 5C is a bottom view of the position detection device pertaining to the embodiment.

FIGS. 5A to 5C are simplified diagrams of the position detection device 248. FIG. 5A is a front view as seen in the X axis direction, FIG. 5B is a side view, and FIG. 5C is a bottom view. FIGS. 5A to 5C are diagrams of when the position detection device 248 is in its initial state. Here, "initial state" indicates a state in which the center point of a straight line connecting the detection center of a first magnetism detection element 152 and the detection center of a second magnetism detection element 153, and the center point of the movement range of a position detection magnet 154 (discussed below) are opposite each other.

The position detection device 248 detects movement of the movable frame 242 with respect to the stationary frame 241. As shown in FIGS. 5A to 5C, the position detection device 248 comprises the position detection magnet 154 (an example of a magnetism generation portion) that is bipolarly magnetized in-plane, and a detection portion 150 (a holding member 151, the first magnetism detection element 152, and the second magnetism detection element 153).

The position detection magnet 154 is disposed on the movable frame 242. As shown in FIGS. 5A and 5B, the position detection magnet 154 is disposed opposite the detection portion 150. More precisely, the position detection magnet 154 is opposite the holding member 151 in the optical axis direction. Even more precisely, the position detection magnet 154 is opposite the first magnetism detection element 152 and the second magnetism detection element 153.

The position detection magnet 154 is a cuboid magnet that is bipolarly magnetized. As shown in FIG. 5A, the position detection magnet 154 has a polarization line in the X direction in the X-Y plane. As shown in FIGS. 5B and 5C, the magnetization direction of the position detection magnet 154 (Z direction) is the same as the magnetic sensitivity direction of the two magnetism detection elements 152 and 153. As shown in FIG. 5C, the position detection magnet 154 has mutually opposing magnetic fluxes in the Z direction.

As shown in FIG. 5A, the length W1 of the position detection magnet 154 in the X direction is 2.0 mm, for example, and the length W2 in the Y direction is 6.0 mm, for example. The length W4 between the first magnetism detection element 152 and the second magnetism detection element 153 is 0.8 mm, for example. Also, as shown in FIG. 5C, the thickness W3 in the Z direction is 1.6 mm, for example. The distance W5 in the Z direction between the surface of the position detection magnet 154, and the first magnetism detection element 152 and the second magnetism detection element 153 is 1.25 mm, for example.

As shown in FIGS. 5A to 5C, the detection portion 150 is configured as a unitary member. More precisely, the detection portion 150 comprises the holding member 151, the first magnetism detection element 152, and the second magnetism detection element 153. The first magnetism detection element 152 and the second magnetism detection element 153 are molded integrally with the holding member 151.

The holding member 151 is disposed on the stationary frame 241. The holding member 151 holds the first magnetism detection element 152 and the second magnetism detection element 153 in the interior. The magnetic sensitivity direction of the first magnetism detection element 152 and the magnetic sensitivity direction of the second magnetism detection element 153 are perpendicular to the position detection magnet 154. More specifically, the magnetic sensitivity direction of the first magnetism detection element 152 and the magnetism sensitivity direction of the second magnetism detection element 153 are the Z direction.

As shown in FIGS. 4 and 5A to 5C, the first magnetism detection element 152 and the second magnetism detection element 153 are disposed in the holding member 151 so that a straight line connecting the first magnetism detection element 152 and the second magnetism detection element 153 is parallel to the straight part of the translational drive coil 246. Also, the first magnetism detection element 152 and the second magnetism detection element 153 are disposed in the holding member 151 so that a straight line connecting the first magnetism detection element 152 and the second magnetism detection element 153 is be perpendicular to a straight line connecting the rotational axis pin A2 and the center of the image stabilization lens 243 (or the lens hole D1).

As shown in FIGS. 5A to 5C, the first magnetism detection element 152 and the second magnetism detection element 153 are disposed opposite the position detection magnet 154 so as to be parallel to the polarization line LP of the position detection magnet 154. That is, a straight line connecting the detection center of the first magnetism detection element 152 and the detection center of the second magnetism detection element 153 is parallel to the polarization line LP of the position detection magnet 154. Also, the center point of a straight line connecting the detection center of the first magnetism detection element 152 and the detection center of the second magnetism detection element 153 is opposite the center point of the polarization line LP of the position detection magnet 154.

3. Operation of OIS Unit

With the OIS unit 240, the image stabilization lens 243 is driven by the translational actuator 130 and the rotational actuator 140. Blurring of the image formed by the imaging element is corrected by this configuration.

More specifically, when current flows to the translational drive coil 246, Y direction magnetic thrust is generated between the straight part of the translational drive coil 246 and the translational drive magnet 244. This causes translational movement of the movable frame 242 in the Y direction. Specifically, blurring of the image in the Y direction is corrected.

When current flows to the rotational drive coil 247, X direction magnetic thrust is generated between the straight part of the rotational drive coil 247 and the rotational drive magnet 245. Consequently, the rotational axis pin A2 and the slit B2 restrict translational movement in the X direction, so the movable frame 242 pivots around the rotational axis pin A2. Specifically, blurring of the image in the X direction is corrected.

4. Operation of Position Detection Device

As discussed above, the amount of movement of the movable frame 242 must be calculated in order to correct blurring of the image in the OIS unit 240. This movement amount is computed by the position detection device 248. More precisely, computation of the movement amount, that is, the processing discussed below, is executed on the basis of the output from the position detection device 248.

Here, a first output value of the first magnetism detection element 152 is defined as V1, and a second output value of the second magnetism detection element 153 is defined as V2. V1, V2, or the relational formula (aV1+bV2)/n, for example, is used for position detection in a direction perpendicular to the polarization line LP (the Y direction). The relational formula (|V1|−|V2|) or (|V1|−|V2|)/(|V1|+|V2|) is used for position detection along the polarization line LP (the X direction). a and b are zero or a positive real number, and n is a positive real number.

Figure 6:
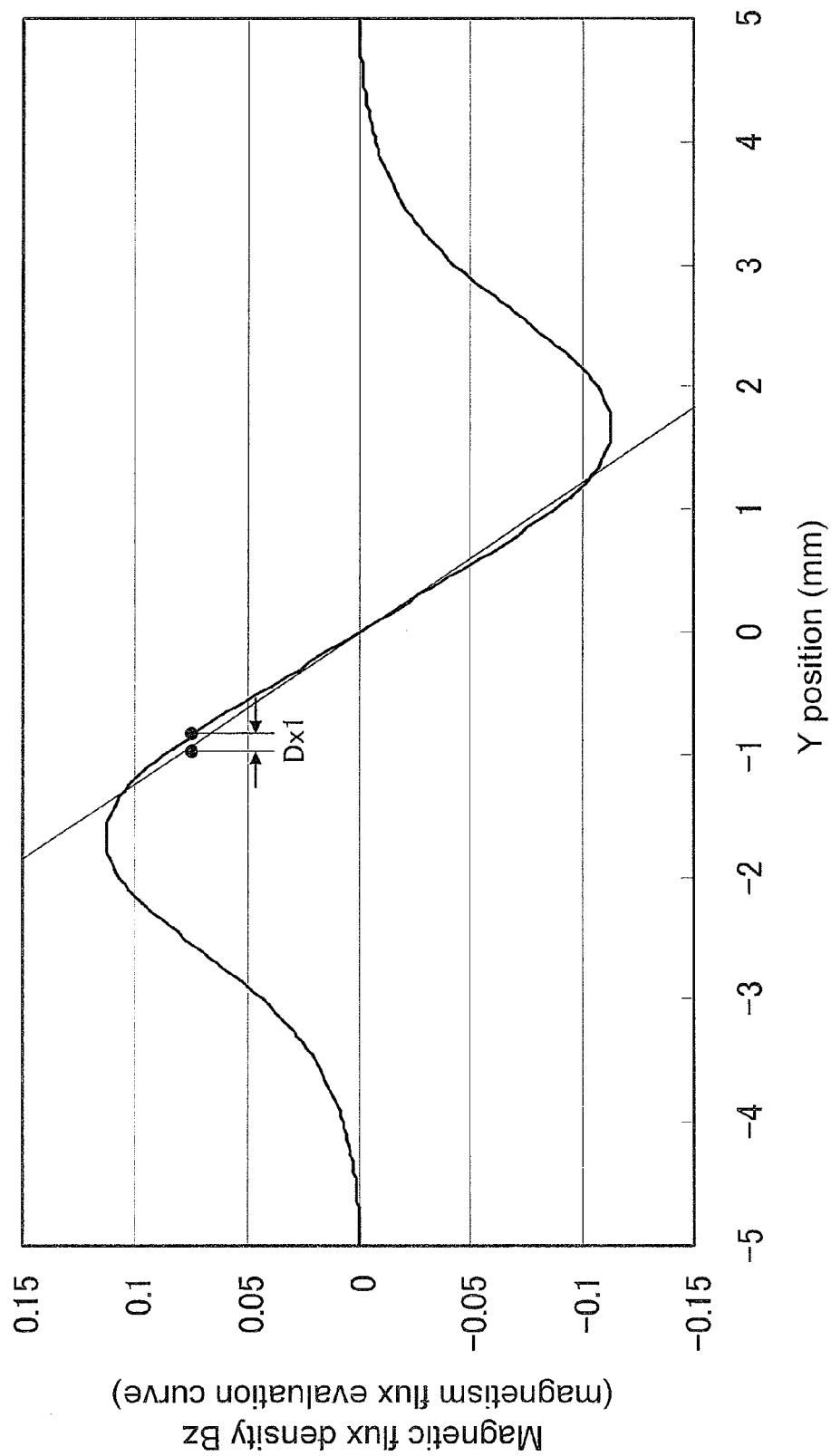
FIG. 6 is a graph of the relation between the magnetic flux density in the Z direction and the position in the Y direction of the position detection device pertaining to the embodiment.

The above-mentioned computation will now be described in more specific terms on the basis of the magnetic flux density shown in FIGS. 6 and 7. As shown in FIG. 6, when the movable frame 242 undergoes translational motion in the Y direction, the magnetic flux density detected by the first magnetism detection element 152 is substantially the same as the magnetic flux density detected by the second magnetism detection element 153. Also, the average value of the magnetic flux density detected by the first magnetism detection element 152 and the magnetic flux density detected by the second magnetism detection element 153 is calculated to find the distribution of first magnetic flux evaluation values (first magnetic flux evaluation curve). In this case, since the magnetic flux density detected by the first magnetism detection element 152 is substantially the same as the magnetic flux density detected by the second magnetism detection element 153, the first magnetic flux evaluation curve is substantially the same as what is shown in FIG. 6. The amount of movement of the movable frame 242 in the Y direction is determined on the basis of this first magnetic flux evaluation curve. In this case, as discussed above, the amount of movement of the movable frame 242 may be determined using just one of the two magnetic flux densities.

More precisely, the amount of movement of the movable frame 242 in the Y direction is calculated as follows. As shown in FIG. 6, the first magnetic flux evaluation curve is approximated by a straight line. Here, the first magnetic flux evaluation curve is approximately a straight line within a specific range using the origin as a reference. This approximate straight line is correlated with the position in the Y direction (a direction perpendicular to the polarization line LP) to execute position detection in the Y direction. The specific range is set so that the difference Dx1 between the approximate straight line and the magnetic flux density curve is be at or below a specific value. For example, as shown in FIG. 6, the specific range is set so that the difference (=Dx1) between the X axis value of the first magnetic flux evaluation curve with respect to a given Y axis value, and the X axis value of the approximate straight line with respect to this Y axis value will be at or below a specific difference. For example, this specific difference is set to at least 0% and no more than 10%.

Figure 7:
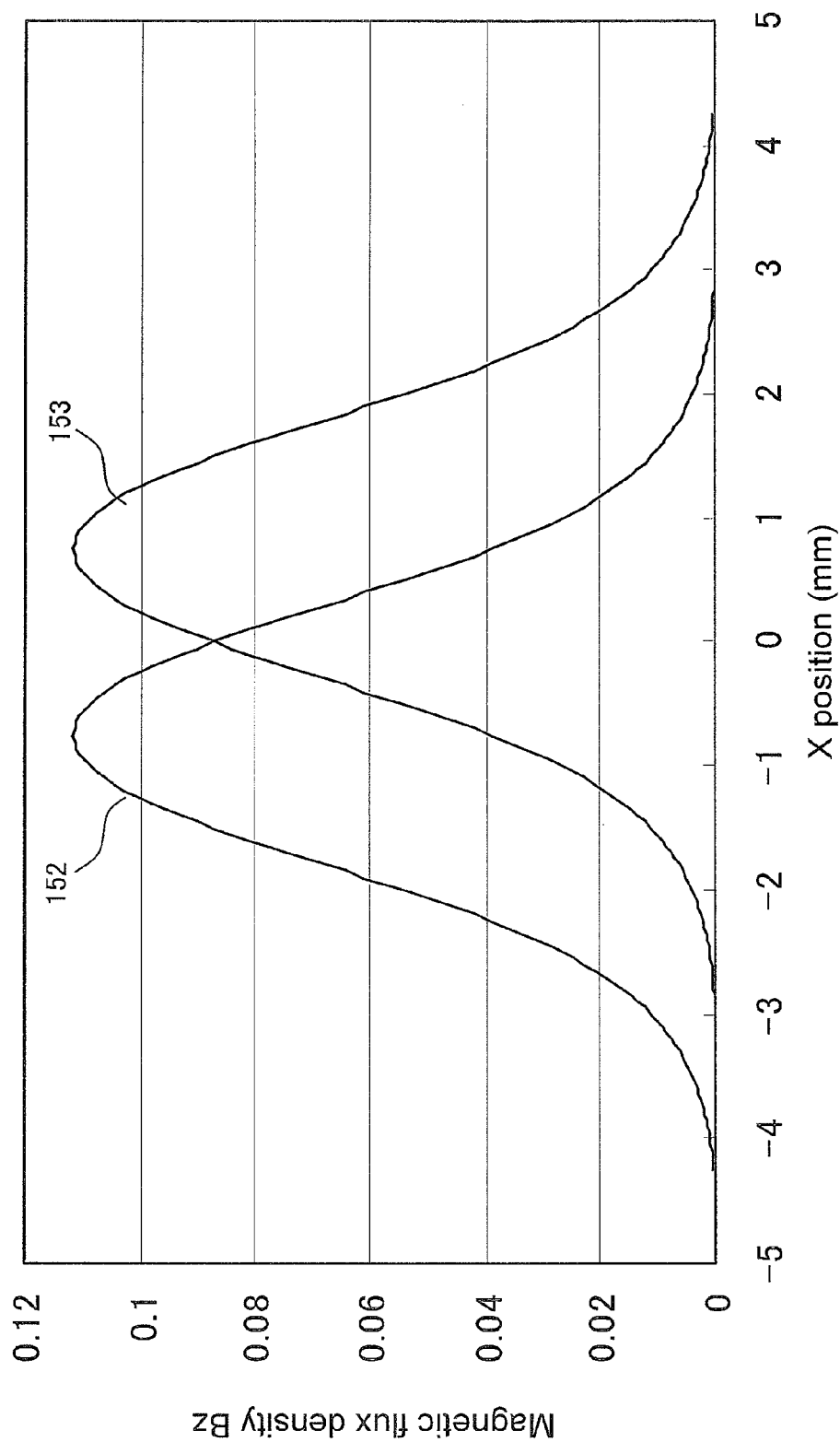
FIG. 7 is a graph of the relation between the magnetic flux density in the Z direction and the position in the X direction of two position detection devices on the N pole side pertaining to the embodiment.

On the other hand, when the movable frame 242 undergoes pivoting motion in the X direction, as shown in FIG. 7, a phase difference occurs between the magnetic flux density detected by the first magnetism detection element 152 and the magnetic flux density detected by the second magnetism detection element 153. In this case, the difference between the magnetic flux density detected by the first magnetism detection element 152 and the magnetic flux density detected by the second magnetism detection element 153 is calculated to find the distribution of second magnetic flux evaluation values (second magnetic flux evaluation curve). The amount of movement of the movable frame 242 in the X direction is determined on the basis of this second magnetic flux evaluation curve. In this case, as discussed above, the amount of movement of the movable frame 242 may be determined by non-dimensionalizing the difference between the two magnetic flux densities.

Figure 8:
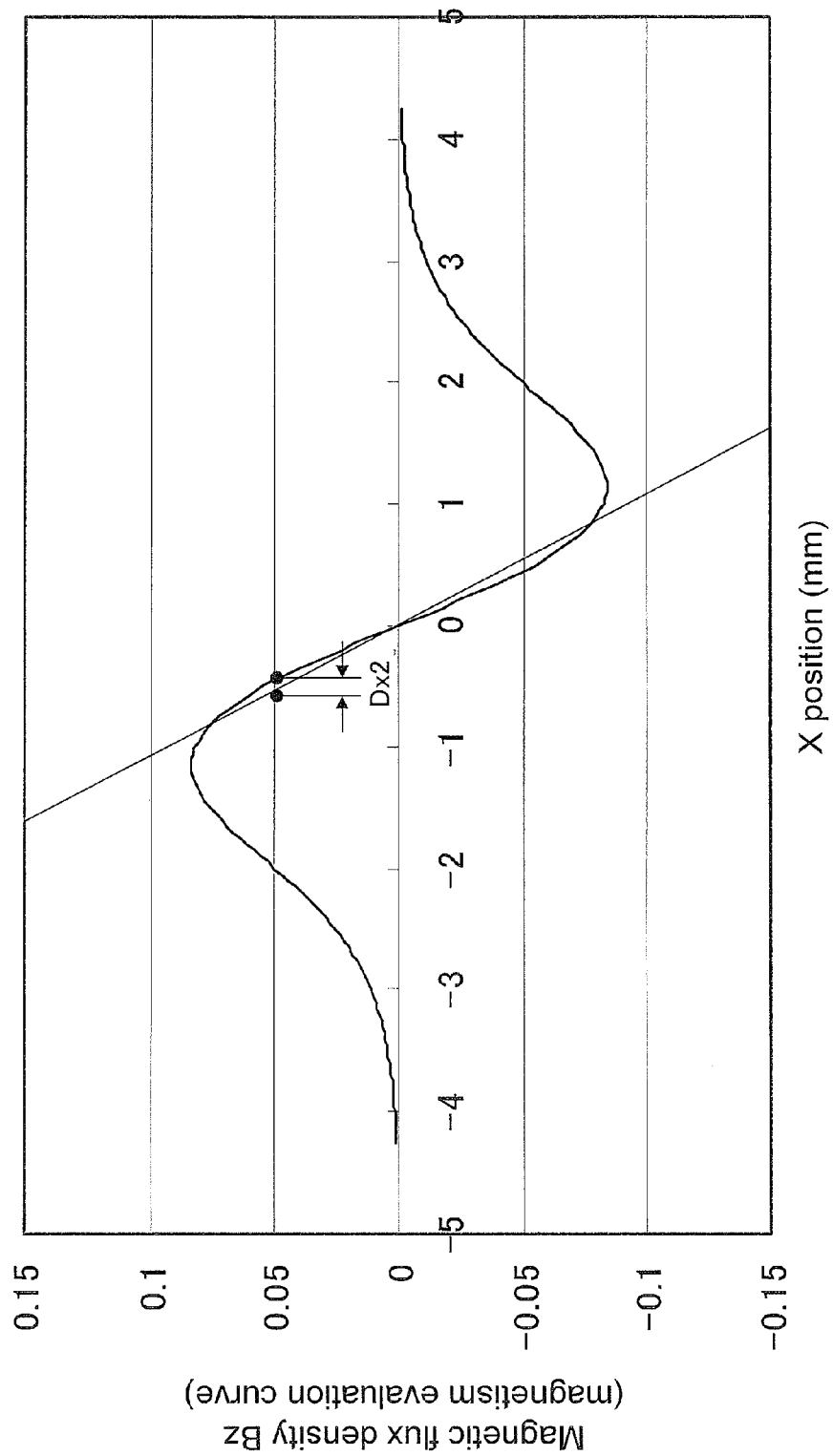
FIG. 8 is a graph of the relation between the magnetic flux density in the Z direction and the position in the X direction of two position detection devices on the N pole side pertaining to the embodiment.

More precisely, the amount of movement of the movable frame 242 in the X direction is calculated in the same manner as the amount of movement in the Y direction discussed above. As shown in FIG. 8, the second magnetic flux evaluation curve is approximated by a straight line. Here, the second magnetic flux evaluation curve is approximately a straight line within a specific range using the origin as a reference. This approximate straight line is correlated with the position in the X direction (a direction along the polarization line LP) to execute position detection in the Y direction. The specific range is set so that the difference Dx2 between the approximate straight line and the magnetic flux density curve is at or below a specific value. For example, as shown in FIG. 8, the specific range is set so that the difference (=Dx2) between the X axis value of the second magnetic flux evaluation curve with respect to a given Y axis value, and the X axis value of the approximate straight line with respect to this Y axis value is be at or below a specific difference. For example, this specific difference is set to at least 0% and no more than 10%.

5. Conclusion

With a conventional image stabilization device, two position detection devices were used. Therefore, there had to be enough space to dispose two position detection devices, and this imposed limitations on the layout, size, and so forth of the electromagnetic actuators. Specifically, a problem was encountered in that there was little latitude in the design of the electromagnetic actuators. Also, if an attempt was made to make the image stabilization device more compact, there was even less latitude in the design of the electromagnetic actuators. This problem can be solved with the technology disclosed herein.

(1) The position detection device 248 comprises the position detection magnet 154 (an example of a magnetism generation portion) and the detection portion 150. The position detection magnet 154 is a magnet that is bipolarly magnetized in-plane. The detection portion 150 has the first magnetism detection element 152, the second magnetism detection element 153, and the holding member 151. The second magnetism detection element 153 is disposed side by side with the first magnetism detection element 152. The holding member 151 holds the first magnetism detection element 152 and the second magnetism detection element 153. The holding member 151 is capable of relative movement parallel to the plane of the position detection magnet 154.

With this position detection device 248, the following conditions are satisfied. The angle formed by a first direction H1 passing through the first magnetism detection element 152 and the second magnetism detection element 153 and the direction in which the polarization line LP of the position detection magnet 154 extends is other than 90 degrees. A line segment connecting the first magnetism detection element 152 and the second magnetism detection element 153, and the polarization line LP of the position detection magnet 154 are either skewed lines or parallel. The term "skewed lines" here indicates a state in which two line segments (straight lines) do not intersect and are not in the same plane. For example, if the plane of the position detection magnet 154 is viewed in a direction perpendicular to the plane of the position detection magnet 154, a line segment connecting the first magnetism detection element 152 and the second magnetism detection element 153, and the polarization line LP of the position detection magnet 154 appear to either intersect or coincide. But, if the plane of the position detection magnet 154 is viewed in a direction parallel to the plane of the position detection magnet 154, the line segment connecting the first magnetism detection element 152 and the second magnetism detection element 153, and the polarization line LP of the position detection magnet 154 do not intersect because they are on different planes.

With this configuration, when the detection portion 150 moves relative to the position detection magnet 154, position detection in two directions can be executed by the first magnetism detection element 152 and the second magnetism detection element 153. Specifically, two-directional position detection can be executed by the single position detection device 248. Also, with this configuration, since there is no need to provide two of the position detection devices 248, the structure to which the position detection device 248 can be more compact.

(2) With this position detection device 248, the detection portion 150 executes position detection with respect to the first direction H1 on the basis of a first output value V1 outputted from the first magnetism detection element 152 and a second output value V2 outputted from the second magnetism detection element 153. Also, the detection portion 150 executes position detection with respect to the second direction H2, which is perpendicular to the first direction H1, on the basis of the first output value V1 and the second output value V2.

With this configuration, when the detection portion 150 moves relative to the position detection magnet 154, the first magnetism detection element 152 and the second magnetism detection element 153 can reliably execute position detection in two directions. Specifically, two-directional position detection can be executed by the single position detection device 248.

Figure 9A:
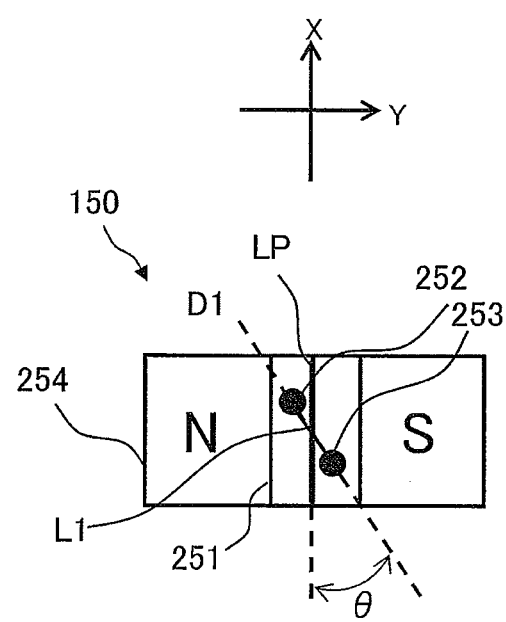
FIG. 9A is a front view of another position detection device pertaining to the other embodiment 1.

(3) With this position detection device 248, the angle θ formed by the polarization line LP and the first direction H1 is an angle other than 90 degrees. This angle θ is at least −60 degrees and no more than 60 degrees, using the first direction H1 as a reference. For example, in FIG. 5A, the angle θ is zero. FIG. 9A is an example of when the angle θ is set to a range of at least 0 degrees and no more than 60 degrees.

With this configuration, the position of the detection portion 150 with respect to the position detection magnet 154 can be accurately detected. Specifically, the position of the detection portion 150 in two directions can be accurately detected by the single position detection device 248.

(4) With this position detection device 248, a straight line passing through the first magnetism detection element 152 and the second magnetism detection element 153 is parallel to the polarization line LP of the position detection magnet 154.

With this configuration, when the first magnetism detection element 152 and the second magnetism detection element 153 undergo translational movement in the Y direction (a direction perpendicular to the polarization line LP), the magnetic flux density detected by the first magnetism detection element 152 is substantially the same as the magnetic flux density detected by the second magnetism detection element 153. Consequently, the distribution of the above-mentioned first magnetic flux evaluation values (first magnetic flux evaluation curve) can be predicted accurately and easily. Specifically, the position of the detection portion 150 with respect to the position detection magnet 154 can be accurately detected.

(5) With this position detection device 248, the detection portion 150 moves relative to the position detection magnet 154 as a result of rotation around the rotational axis pin A2 and/or linear motion using the rotational axis pin A2 as a reference.

With this configuration, since the single rotational axis pin A2 serves as two reference points for rotation and linear motion, the position of the detection portion 150 with respect to the position detection magnet 154 can be accurately detected.

(6) This OIS unit 240 comprises the position detection device 248 having the above-mentioned detection portion 150, the stationary frame 241, and the movable frame 242. The detection portion 150 provided to the stationary frame 241. The position detection magnet 154 is provided to the movable frame 242.

With this configuration, since the OIS unit 240 is equipped with the position detection device 248, when the movable frame 242 moves relative to the stationary frame 241, two-directional position detection can be executed by the detection portion 150. Specifically, two-directional position detection can be executed by the single position detection device 248. Also, with this configuration, since there is no need to provide two of the position detection devices 248, the OIS unit 240 can be more compact.

(7) With this OIS unit 240, the movable frame 242 moves relative to the stationary frame 241 due to the rotation of the movable frame 242 around the rotational axis pin A2 and/or the linear motion of the movable frame 242 with the rotational axis pin A2 as a reference.

With this configuration, since the single rotational axis pin A2 serves as two reference points for rotation and linear motion, the position of the detection portion 150 with respect to the position detection magnet 154 can be accurately detected.

(8) This lens barrel 100 is equipped with the above-mentioned position detection device 248. With this configuration, two-directional position detection can be executed by the single position detection device 248 provided to the lens barrel 100. Also, with this configuration, since there is no need to provide two of the position detection devices 248 to the lens barrel 100, the lens barrel 100 can be more compact.

(9) This lens barrel 100 is equipped with the above-mentioned OIS unit 240. With this configuration, two-directional position detection can be executed by the single position detection device 248 provided to the OIS unit 240. Also, with this configuration, since there is no need to provide two of the position detection devices 248 to the lens barrel 100, the lens barrel 100 can be more compact.

Other Embodiments

Embodiments were described above as examples of the technology disclosed here, and the appended drawings and a detailed description were provided to this end. Therefore, the constituent elements illustrated in the appended drawings and discussed in the detailed description can encompass not only those constituent elements which are essential to solving the problem, but also constituent elements that are not essential to solving the problem. Accordingly, just because these non-essential constituent elements are illustrated in the appended drawings and discussed in the Specification, it should not be concluded that these non-essential constituent elements are essential.

Also, the above embodiments were given to illustrate examples of the technology disclosed herein, so various modifications, substitutions, additions, omissions, and so forth can be made within the scope of the patent claims or equivalents thereof. Specifically, this disclosure is not limited to or by the above embodiments, and can be suitably modified. Other embodiments of this disclosure will be described below.

(A) In the above embodiments, an example was given in which the movable frame 242 underwent translation and pivoting with respect to the stationary frame 241. Instead, the configuration may be such that the movable frame 242 undergoes translation in two directions with respect to the stationary frame 241. Also, the configuration may be such that the movable frame 242 is supported by a rotating body. A configuration such as this affords the same effect as discussed above.

(B) In the above embodiments, an example was given in which the detection portion 150 was configured so that the straight line L1 connecting the first magnetism detection element 152 and the second magnetism detection element 153 was parallel to the polarization line LP of the position detection magnet 154. With this configuration, the first magnetism detection element 152 and the second magnetism detection element 153 will sometimes move over the polarization line LP, depending on how the movable frame 242 is supported. In this case, theoretically there is no output from the first magnetism detection element 152 or the second magnetism detection element 153. Therefore, in this case there is the risk that the position of the movable frame 242 cannot be detected.

Figure 9B:
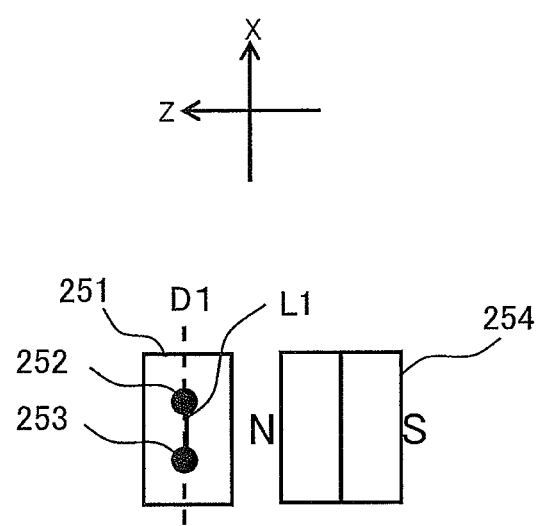
FIG. 9B is a side view of another position detection device pertaining to the other embodiment 1.
Figure 9C:
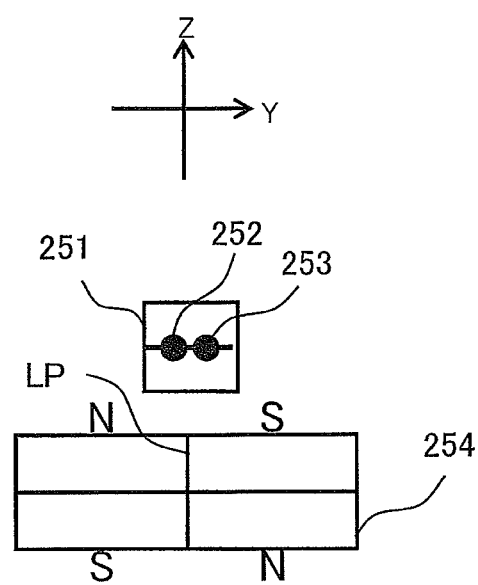
FIG. 9C is a bottom view of another position detection device pertaining to the other embodiment 1.

To solve this problem, as shown in FIG. 9, the detection portion 150 may be configured so that the straight line L1 connecting the first magnetism detection element 152 and the second magnetism detection element 153 crosses the polarization line LP of the position detection magnet 154.

In this case, the amounts of movement of the movable frame 242 in the X and Y directions are calculated in the same way as in the calculation of the amounts of movement of the movable frame 242 in the X and Y directions in the above embodiments. Thus calculating the amount of movement of the movable frame 242 solves the above problem. A configuration such as this affords the same effect as discussed above.

(C) In the above embodiments, an example was given in which the detection portion 150 had the two magnetism detection elements 152 and 153. When the first magnetism detection element 152 and the second magnetism detection element 153 are disposed as in the above embodiments, the first magnetism detection element 152 and the second magnetism detection element 153 will sometimes move over the polarization line LP, depending on how the movable frame 242 is supported. In this case, theoretically there is no output from the first magnetism detection element 152 or the second magnetism detection element 153. Therefore, in this case there is the risk that the position of the movable frame 242 in the X direction cannot be detected.

Figure 10A:
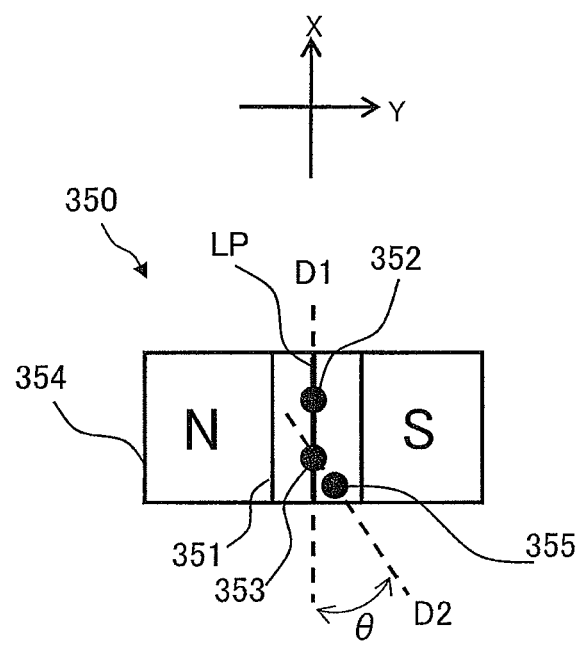
FIG. 10A is a front view of another position detection device pertaining to the other embodiment 2.
Figure 10B:
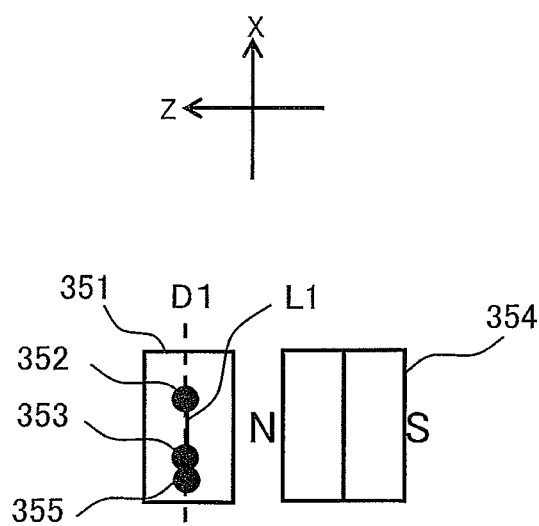
FIG. 10B is a side view of another position detection device pertaining to the other embodiment 2.
Figure 10C:
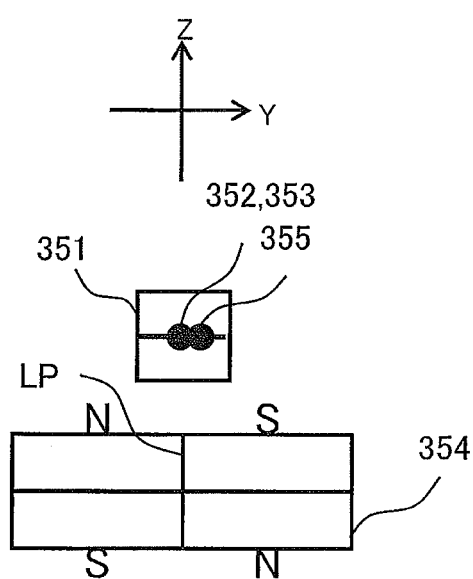
FIG. 10C is a bottom view of another position detection device pertaining to the other embodiment 2.

To solve this problem, as shown in FIG. 10, the detection portion 150 may have three magnetism detection elements (a first magnetism detection element 352, a second magnetism detection element 353, and a third magnetism detection element 355). In this case, for example, the third magnetism detection element 355 is disposed a specific distance away from a straight line passing through the first magnetism detection element 352 and the second magnetism detection element 353.

In this case, the amount of movement of the movable frame 242 in the X direction is calculated as follows. First, as discussed above, a first magnetic flux density difference is calculated on the basis of the magnetic flux density of the first magnetism detection element 352 and the magnetic flux density of the second magnetism detection element 353. Also, a second magnetic flux density difference is calculated as discussed above on the basis of the magnetic flux density of the second magnetism detection element 353 and the magnetic flux density of the third magnetism detection element 355. Also, a third magnetic flux density difference is calculated as discussed above on the basis of the magnetic flux density of the third magnetism detection element 355 and the magnetic flux density of the first magnetism detection element 352.

Then, as discussed above, the first magnetic flux density difference is used for position detection, the second magnetic flux density difference is used for position detection, and the third magnetic flux density difference is used for position detection. The three position detection results are then averaged to determine the final magnetic flux density difference (the above-mentioned second magnetic flux evaluation curve). The amount of movement of the movable frame 242 in the X direction is calculated in the same way as above on the basis of this final magnetic flux density difference.

The above problem can be solved by thus calculating the amount of movement of the movable frame 242 in the X direction. A configuration such as this affords the same effect as discussed above.

In this case, the amount of movement of the movable frame 242 in the Y direction is calculated as follows. First, the above-mentioned first magnetic flux evaluation curve is found by calculating the average of the magnetic flux density of the first magnetism detection element 352, the second magnetism detection element 353, and the third magnetism detection element 355. Then, the amount of movement of the movable frame 242 in the Y direction is calculated in the same way as above, on the basis of this first magnetic flux evaluation curve. In this case, as discussed above, the amount of movement of the movable frame 242 in the Y direction may be determined using just one of the three magnetic flux densities.

Figure 11:
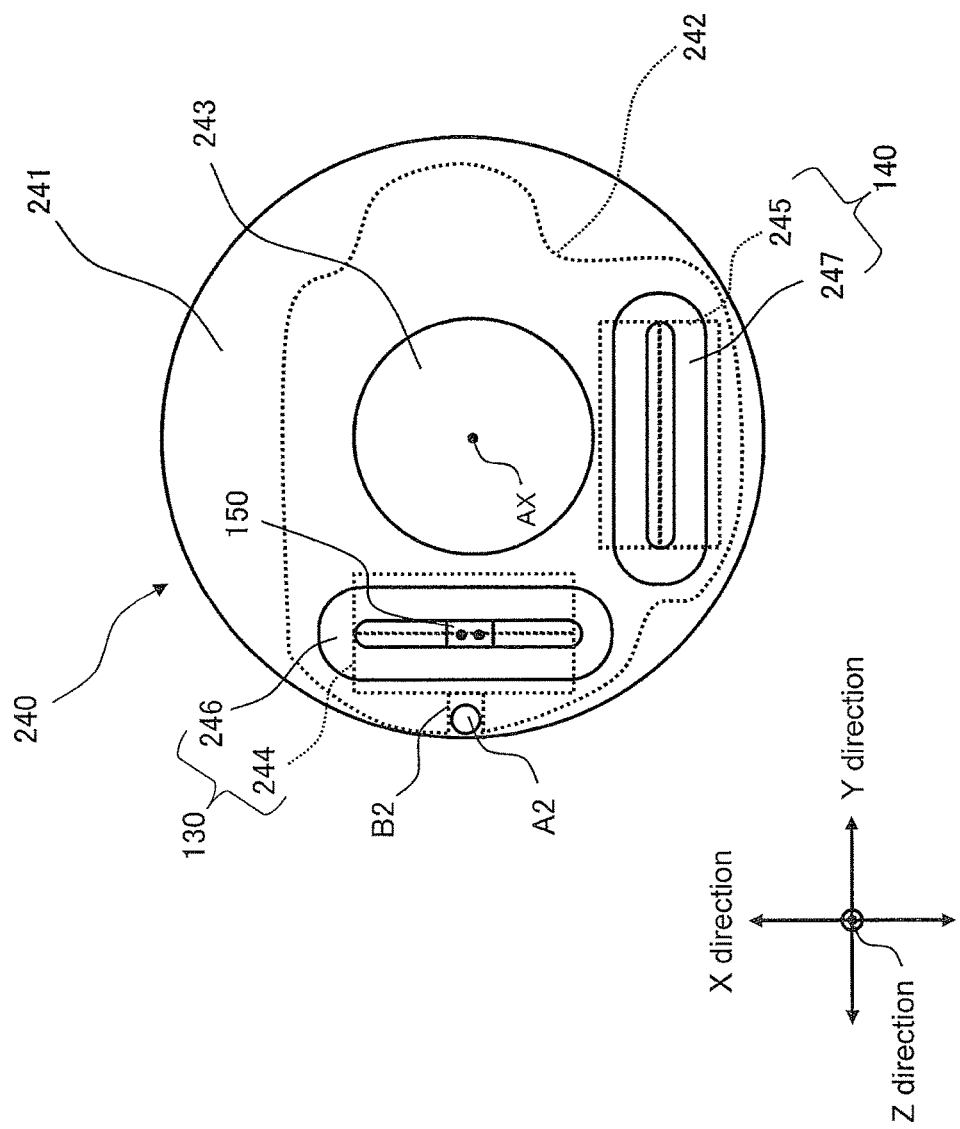
FIG. 11 is a simplified diagram of the position detection device pertaining to the other embodiment 3.

(D) In the above embodiments, an example was given in which the movable frame 242 was configured so that the image stabilization lens 243 was located between the detection portion 150 and the translational drive coil 246. Instead, as shown in FIG. 11, the holding member 151 may be disposed on the stationary frame 241 so that the detection portion 150 is surrounded by the translational drive coil 246. Specifically, the detection portion 150 may be disposed within the loops of the translational drive coil 246. In this case, the detection portion 150 is disposed in the interior of the translational drive coil 246, that is, near the rotational axis pin A2. With this configuration, no special space needs to be reserved for disposing the detection portion 150, so the OIS unit 240 can be more compact. Also, since the position detection magnet 154 can be replaced by the translational drive magnet 244, the OIS unit 240 can be made even more compact. A configuration such as this also affords the same effect as discussed above.

In this case, the translational drive coil 246 and the rotational drive coil 247 may be configured so that the image stabilization lens 243 is disposed between the translational drive coil 246 and the rotational drive coil 247.

(E) In the above embodiments, an example was given in which the position detection magnet 154 was mounted on the movable frame 242, and the detection portion 150 was mounted on the stationary frame 241. Instead, the position detection magnet 154 may be mounted to the stationary frame 241, and the detection portion 150 may be mounted to the movable frame 242. A configuration such as this affords the same effect as discussed above.

(F) In the above embodiments, an example was given in which the magnets 244 and 245 were mounted to the movable frame 242, and the coils 246 and 247 were mounted to the stationary frame 241. Instead, the magnets 244 and 245 may be mounted to the stationary frame 241, and the coils 246 and 247 may be mounted to the movable frame 242. A configuration such as this affords the same effect as discussed above.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the position detection device, the drive device, and the lens barrel. Accordingly, these terms, as utilized to describe the present technology should be interpreted relative to the position detection device, the drive device, and the lens barrel.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

Industrial Applicability

The technology disclosed herein can be broadly applied to electronic devices that include position detection devices, drive devices, and lens barrels.

What is claimed is:

1. A position detection device, comprising:
a detection portion including a first magnetism detection element and a second magnetism detection element, the first magnetism detection element and the second magnetism detection element disposed on a first plane; and
a magnetism generation portion disposed at a position opposite the detection portion, the magnetism generation portion including a first magnetized portion and a second magnetized portion,
the first magnetized portion facing the first plane where the first magnetism detection element and the second magnetism detection element are disposed, the first magnetized portion having a first north pole and a first south pole,
the second magnetized portion opposing at an opposite side with respect to a side that the first magnetized portion faces the detection portion, the second magnetized portion having a second north pole and a second south pole,
the first north pole opposing the second south pole in a direction perpendicular to the first plane,
the first south pole opposing the second north pole in the direction perpendicular to the first plane,
a polarization line of the first magnetized portion or the second magnetized portion of the magnetism generation portion is disposed on a second plane different from the first plane;
a line segment connecting the first magnetism detection element and the second magnetism detection element, and the polarization line of the first magnetized portion or the second magnetized portion of the magnetism generation portion are either a) skewed lines or b) parallel,
the detection portion executes position detection of the detection portion relative to the magnetism generation portion with respect to two directions within the first plane that are perpendicular to each other.

2. The position detection device according to claim 1, wherein
the magnetism generation portion includes a polarization line that divides the first magnetized portion into the first north pole side and the first south pole side, and
the first magnetism detection element and the second magnetism detection element are disposed side by side so as to avoid a position at which the first magnetism detection element and the second magnetism detection element are perpendicular or parallel to the polarization line.

3. The position detection device according to claim 1, further configured to calculate relative movement of the magnetism generation portion with respect to the detection portion by using an output of the first magnetism detection element and an output of the second magnetism detection element, wherein
the magnetism generation portion includes a polarization line that divides the first magnetized portion into the first north pole side and the first south pole side, and
if the output of the first magnetism detection element is defined as V1, and the output of the second magnetism detection element is defined as V2,
the position detection device calculates the relative movement perpendicular to the polarization line, from $(aV1+bV2)/n$ (where a is zero or a positive real number, b is zero or a positive real number, and n is a positive real number), and
the position detection device calculates the relative movement parallel to the polarization line, from $(|V1|-|V2|)$ or $(|V1|-|V2|)/(|V1|+|V2|)$.

4. The position detection device according to claim 1, wherein
the magnetism generation portion includes mutually opposing magnetic fluxes with respect to the detection portion.

5. The position detection device according to claim 4, wherein
one of the mutually opposing magnetic fluxes is formed between the first north pole and the second south pole, and
the other of the mutually opposing magnetic fluxes is formed between the first south pole and the second north pole.

* * * * *